United States Patent [19]

Holmes

[11] Patent Number: 4,535,271
[45] Date of Patent: Aug. 13, 1985

[54] HIGH FREQUENCY CIRCUIT FOR OPERATING A HIGH-INTENSITY, GASEOUS DISCHARGE LAMP

[75] Inventor: Kenneth P. Holmes, Houston, Tex.

[73] Assignee: Wide-Lite International, San Marcos, Tex.

[21] Appl. No.: 899,479

[22] Filed: Apr. 24, 1978

Related U.S. Application Data

[63] Continuation of Ser. No. 700,222, Jul. 26, 1976, abandoned, which is a continuation-in-part of Ser. No. 654,926, Feb. 2, 1976, abandoned.

[51] Int. Cl.³ .................. H05B 37/02; H05B 39/04; H05B 41/36
[52] U.S. Cl. .................. 315/209 R; 315/DIG. 5; 315/DIG. 7; 315/224; 315/217; 315/307
[58] Field of Search .................. 315/DIG. 2, 224, 226, 315/219, 238, 306, 307, 310, 311, DIG. 5, DIG. 7, DIG. 4; 323/17, 22

[56] References Cited

U.S. PATENT DOCUMENTS

| | | | |
|---|---|---|---|
| 3,611,021 | 10/1971 | Wallace | 315/DIG. 5 |
| 3,670,202 | 6/1972 | Paine et al. | 315/310 |
| 3,816,794 | 6/1974 | Snyder | 315/310 |
| 3,890,537 | 6/1975 | Park et al. | 315/209 R |
| 3,953,780 | 4/1976 | Anderson et al. | 315/209 |
| 3,967,159 | 6/1976 | Dendy et al. | 315/209 |
| 3,999,100 | 12/1976 | Dendy et al. | 315/DIG. 5 |
| 4,060,751 | 11/1977 | Anderson | 315/DIG. 5 |

Primary Examiner—Saxfield Chatmon
Attorney, Agent, or Firm—Vaden, Eickenroht, Thompson & Jamison

[57] ABSTRACT

A high frequency drive circuit operating as a push-pull, Class C oscillator for driving a high-intensity, gaseous discharge lamp and avoiding the use of a relatively large ballast coil. A highly stable power supply for operating in conjunction with such circuit is also provided.

19 Claims, 11 Drawing Figures

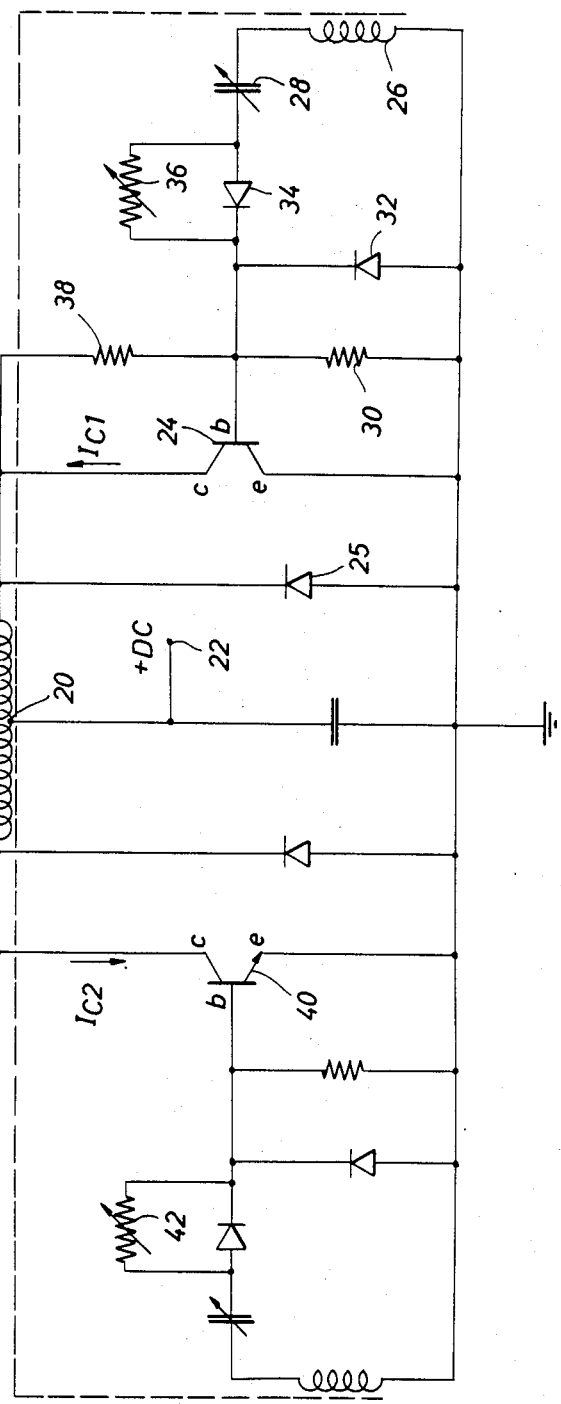
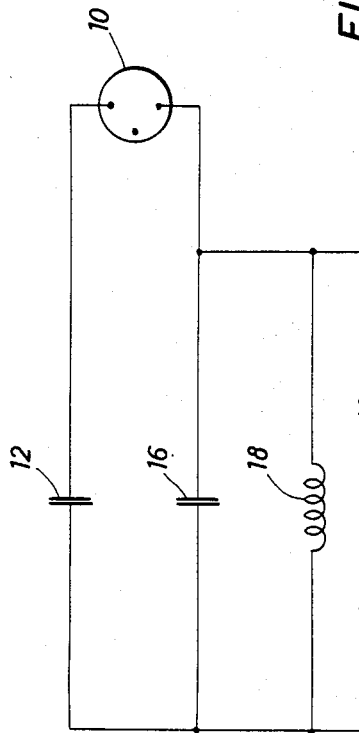
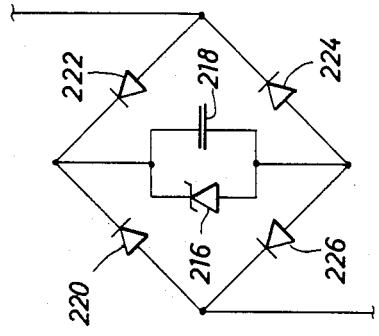
FIG.9
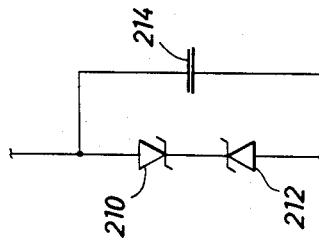
FIG.8

HIGH FREQUENCY CIRCUIT FOR OPERATING A HIGH-INTENSITY, GASEOUS DISCHARGE LAMP

This is a continuation of co-pending application Ser. No. 700,222, filed July 26, 1976, now abandoned, which is a continuation-in-part of copending application Ser. No. 654,926, filed Feb. 2, 1976 of the same inventor.

BACKGROUND OF THE INVENTION

1. Field of the Invention

This invention relates to a curcuit for operating a high intensity, gaseous-discharge lamp without requiring a large ballast transformer, and more specifically, for operating such a lamp at a frequency higher than acoustic resonance for such lamps.

2. Description of the Prior Art

Conventional ballasting of high intensity discharge lamps, such as metal-additive arc lamps, employ transformer-like coils, capacitors, or inductor coils in various combinations to provide proper voltage for starting and limiting the current during operation. Such ballasts are large, relatively expensive, and not efficient at low cost. Simple inductor ballasts are available; however, they provide poor regulation for line voltage variations.

Regulating solid state ballasts have been developed, but heretofore no commercial ballasts have been developed which is suitable for the operating conditions of high pressure mercury, sodium and metal halide lamps to give proper control of lamp wattage for high ranges of lamp voltages, line fluctuations and temperatures.

Although theoretically a lamp may be operated on a combination of applied dc and ac, which would give lower noise than ac alone, it has been discovered that the application of dc is bad for lamp efficiency and life. The application of low audio frequency ac causes noisy ballast conditions. The application of medium frequency ac causes noisy and unstable lamp conditions. In fact, the high pitch whine of lamps operated under such conditions is extremely unpleasant. Therefore, it has not been recognized that high frequency ac, i.e. frequencies above acoustic resonance, may be used with regard to lamps; however, life tests and lumen tests have revealed that high frequency operation beyond a certain range is perfectly satisfactory, both as to providing acceptable lamp operating stability and an absence of audible noise.

As used hereinafter in this application, the term "frequencies above acoustic resonance" is understood to mean frequencies above which the phenomenon of acoustic resonance no longer produces visual disturbances to the emission of light from the gaseous discharge lamp; i.e., above the highest band of acoustic resonant frequencies which either extinguish the lamp or cause unpleasant flickering of the light.

Therefore, it is a feature of this invention to provide an improved operating circuit for a high intensity gaseous discharge lamp that provides a high frequency mode of operation, such circuit employing a high-Q coil to provide the requisite high power at high frequency required for operation.

It is another feature of the present invention to further provide such a circuit that would not injure the lamp or a circuit component either under open or shorted lamp conditions.

It is yet another feature of this invention to provide a circuit that operates under 10-to-1 lamp impedance (wide range of load conditions) change during warm-up and having microsecond lamp ignition speed.

SUMMARY OF THE INVENTION

A preferred embodiment of the present invention includes a drive circuit having a push-pull, Class C oscillator employing a high efficiency transformer, the center tap of the transformer being connected to a dc power source. The oscillator halves are driven in such a fashion so that the application of current provides high frequency at high efficiency to a tank-and-lamp network, which from lamp starting, normal operation, to lamp failure may exhibit a wide range of load impedances to the drive circuit. The frequency of the oscillator is readily adjusted to frequencies above acoustic resonance of the particular lamp.

Also disclosed is a coil configuration used in the tank-and-lamp network for providing an unloaded high-Q of approximately 300 in conjunction with the operating conditions existing for mercury, metal halide and high pressure sodium lamps.

Finally, a stable power supply including emergency features for operation with the circuit is also described, such circuit being capable of removing transients from the applied line voltage. The circuit may incorporate a battery connected through diode connections when the nominal output, dc-line voltage from the power supply varies beyond predetermined limits, either high or low.

BRIEF DESCRIPTION OF THE DRAWING

So that the manner in which the above-recited features, advantages and objects of the invention, as well as others which will become apparent, are attained and can be understood in detail, more particular description of the invention briefly summarized above may be had by reference to the embodiments thereof which are illustrated in the drawings, which drawings form a part of this specification. It is to be noted, however, that the appended drawings illustrate only typical embodiments of the invention and are therefore not to be considered limiting of its scope, for the invention may admit to other equally effective embodiments.

IN THE DRAWINGS

FIG. 1 is a simplified schematic diagram of the present invention showing a preferred embodiment of a push-pull, Class C oscillator connected for driving a high frequency, gaseous-discharge lamp.

Figure 2:
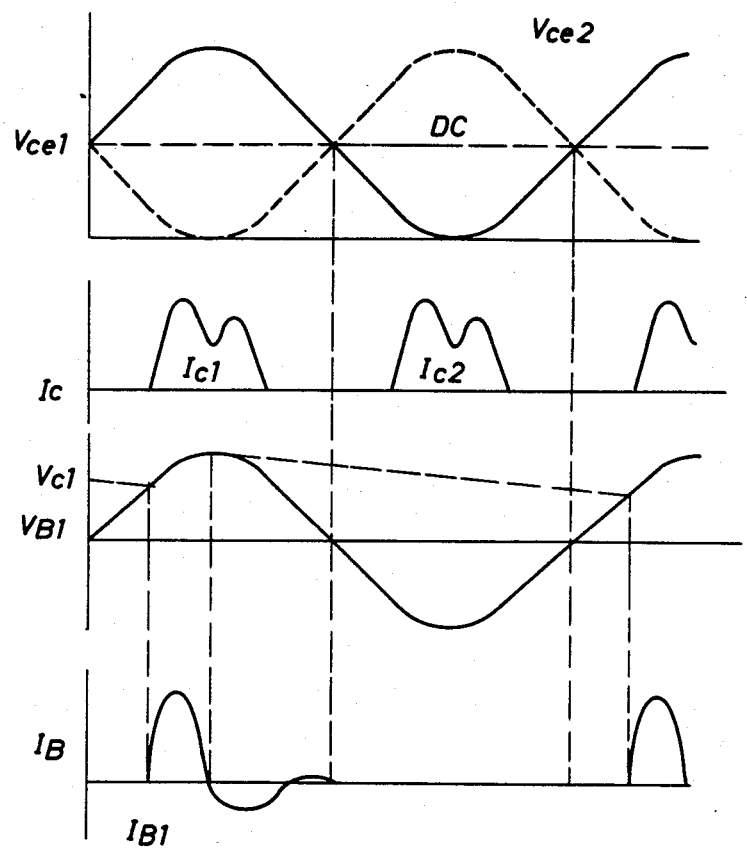

FIG. 2 are wave form diagrams illustrating the operation of the preferred circuit illustrated in FIG. 1.

Figure 3:
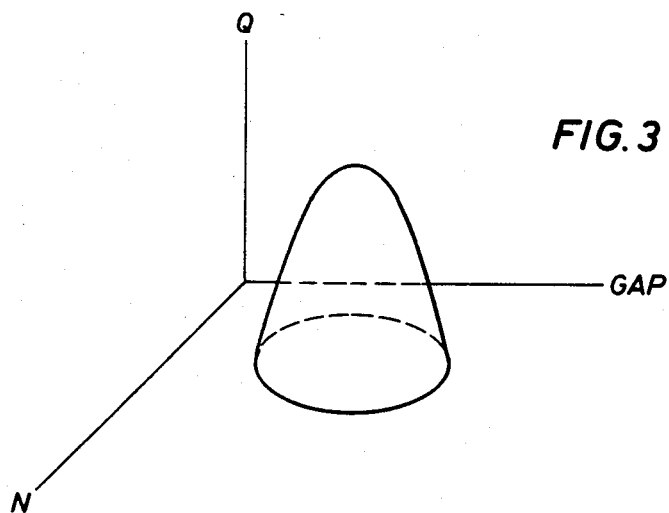

FIG. 3 diagramatically illustrates in three dimensional form, high-Q for a preferred high-Q coil configuration embodiment.

Figure 4:
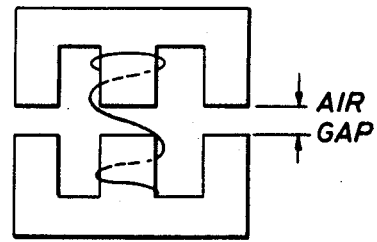

FIG. 4 illustrates a cross section of a preferred high-Q coil configuration.

Figure 5:
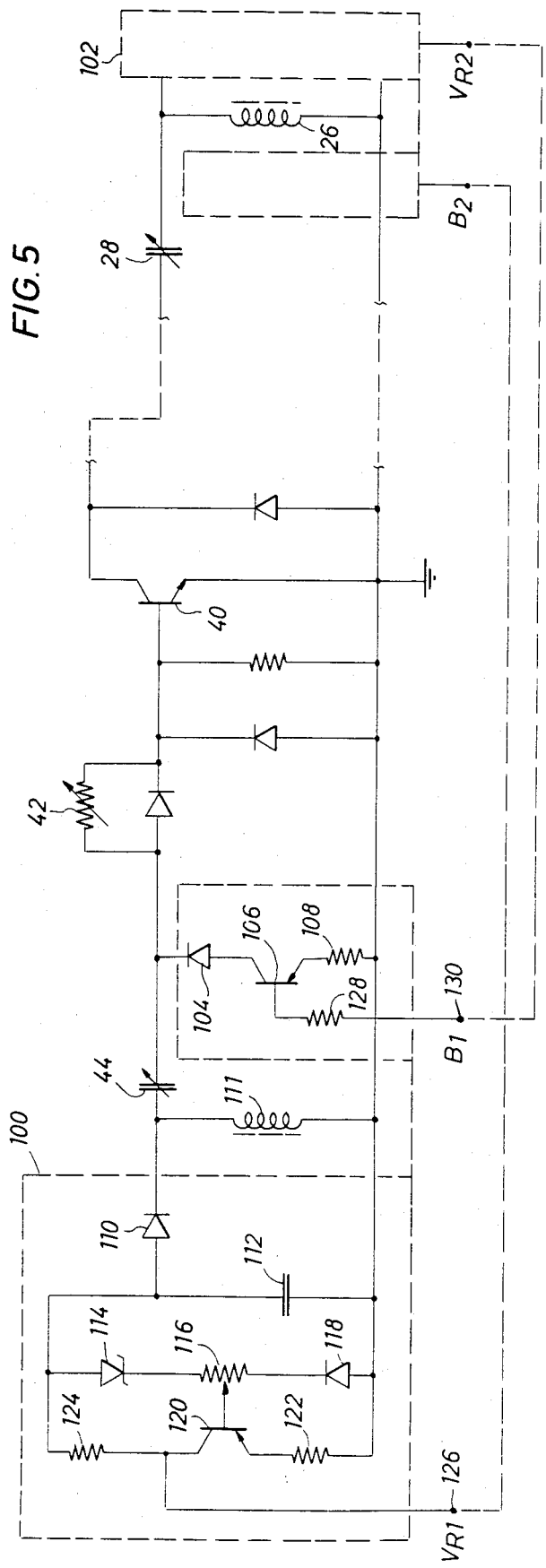

FIG. 5 is a partial schematic diagram of a regulating circuit that may be connected as part of the circuit shown in FIG. 1.

Figure 6:
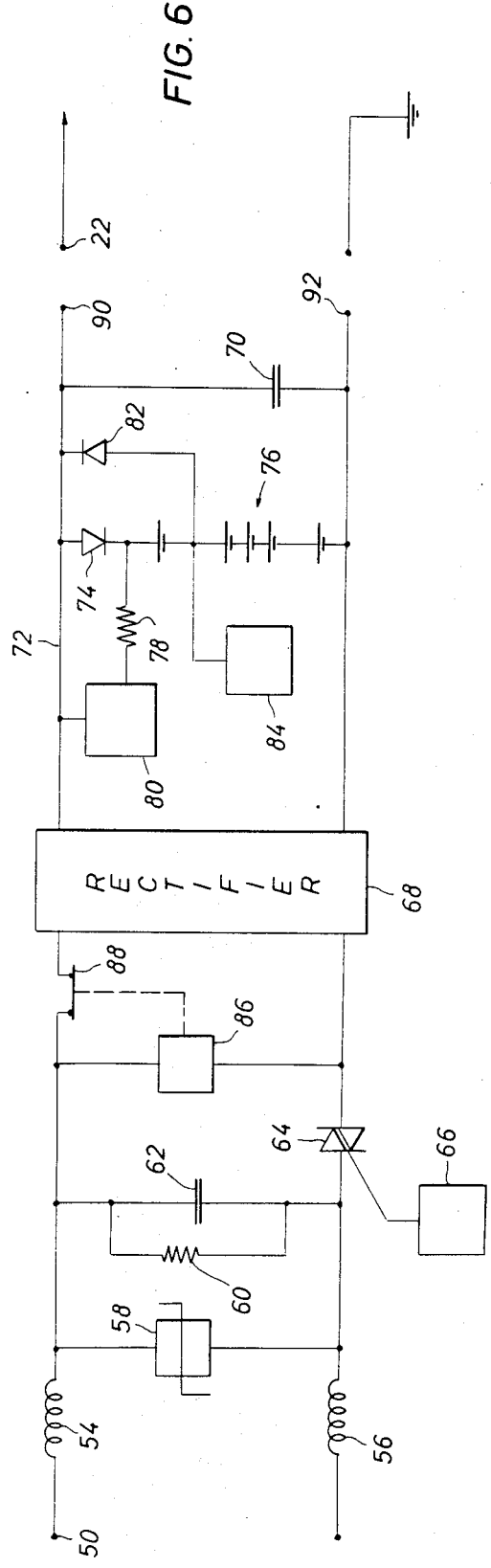

FIG. 6 illustrates in simplified block-and-schematic-diagram form a preferred power supply for operation with the preferred circuit illustrated in FIG. 1.

Figure 7:
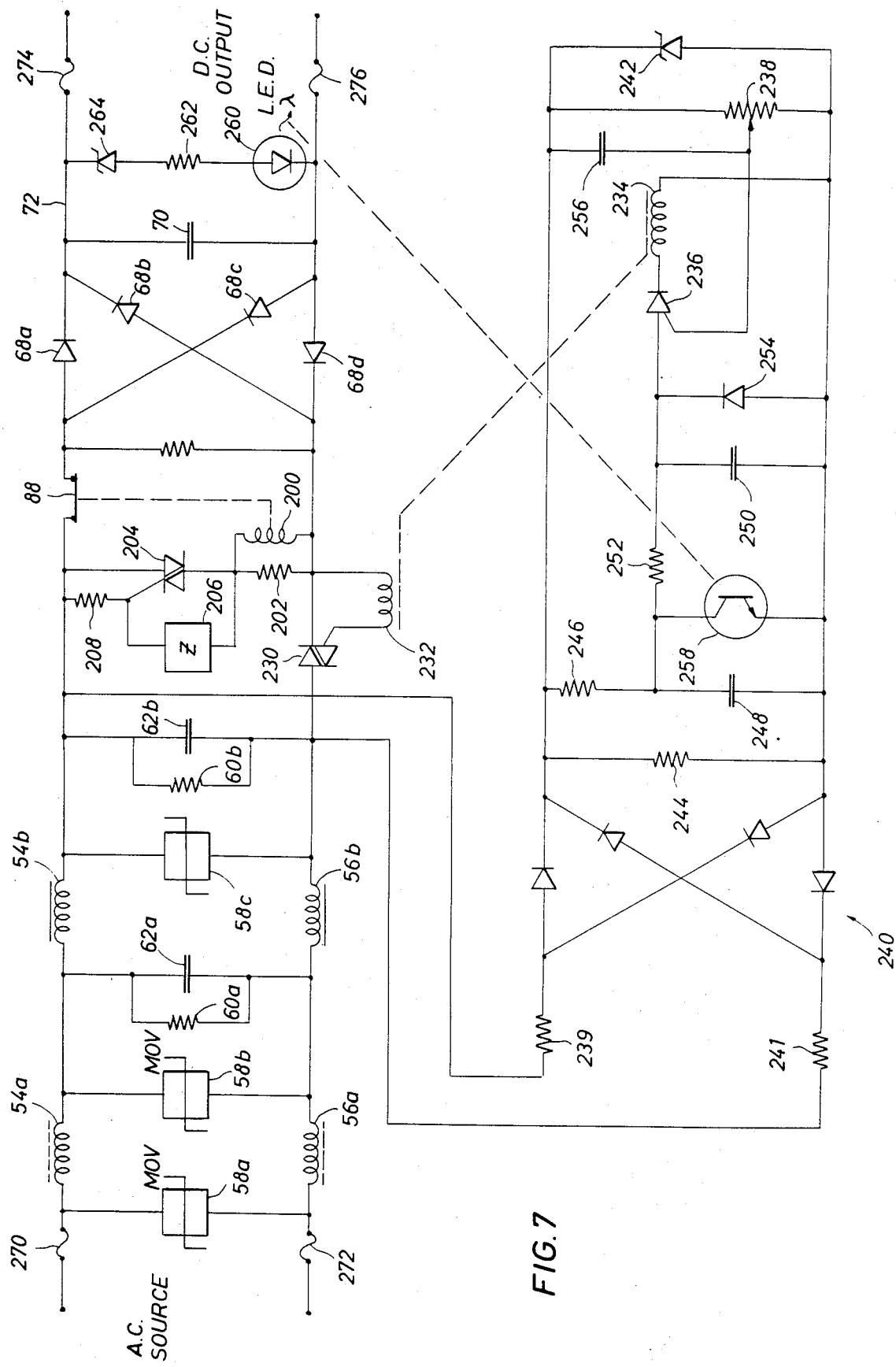

FIG. 7 is a schematic diagram of a preferred power supply for operation with the preferred circuit illustrated in FIG. 1.

FIG. 8 is a schematic diagram of a preferred embodiment of the Z network shown in FIG. 7.

FIG. 9 is a schematic diagram of an alternate preferred embodiment of the Z network shown in FIG. 7.

Figure 10:
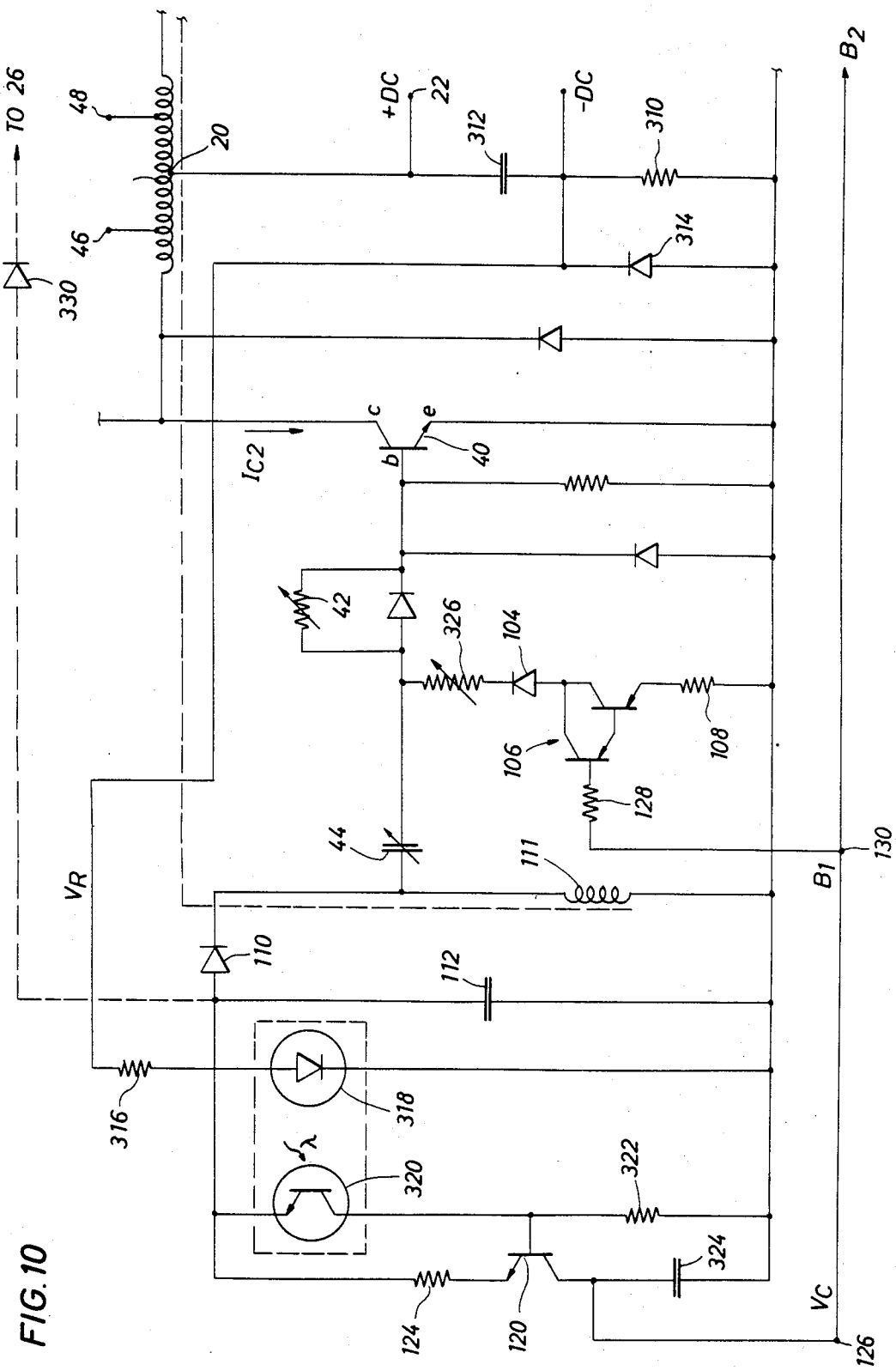

FIG. 10 is a partial schematic diagram of an alternate preferred embodiment of a regulating circuit that may be connected as part of the circuit shown in FIG. 1.

Figure 11:
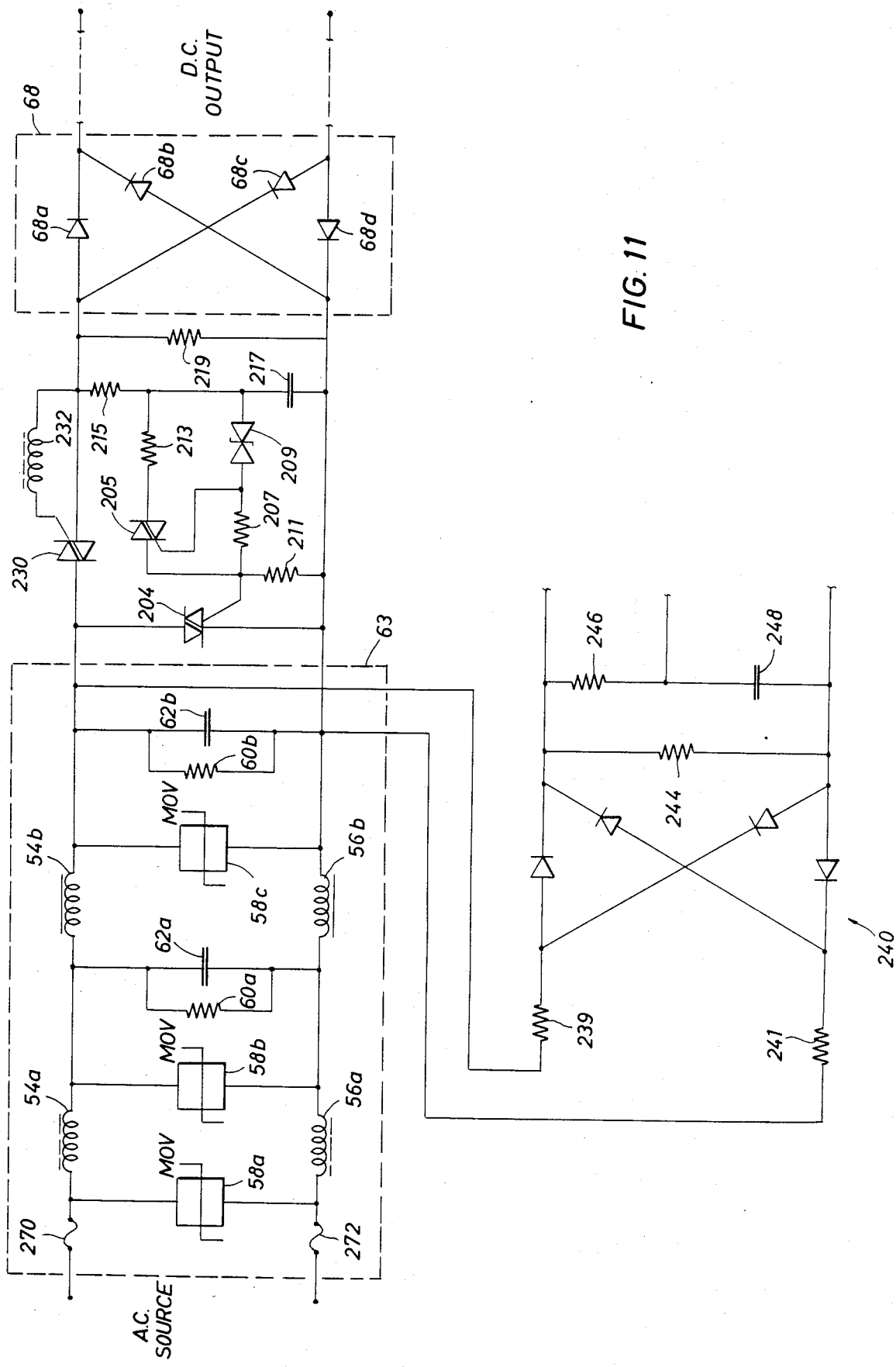

FIG. 11 is a partial schematic diagram of an alternate preferred embodiment of a power supply for operation with the circuit illustrated in FIG. 1.

DESCRIPTION OF PREFERRED EMBODIMENTS

Now referring to the drawings and first to FIG. 1, a high frequency, gaseous-discharge lamp operating circuit is shown in accordance with the present invention. Lamp 10 includes two operating electrodes. One is connected to capacitor 12, which may be characterized as a mica ballast capacitor. Capacitor 12 is connected in series with transformer winding 14, which is then connected to the other operating electrode of lamp 10 to complete a ballast-like connection thereto. As will be explained, this completes a current source connection to a tank-and-lamp network. Connected in shunt with transformer winding 14 is a resonant or tank circuit comprising the parallel combination of capacitor 16 and high-Q coil 18. These components aid in stabilizing the frequency of operation of the current applied to lamp 10 at a high frequency above the acoustic resonance of the lamp, preferably in the range between 60 and 100 kHz.

Transformer winding 14 has a center tap 20 for application of a dc voltage via connecting terminal 22. Transformer winding 14 is part of a push-pull, Class C oscillator having alternatively driving networks especially suited for providing alternate current conduction to transformer winding 14 for efficient high-frequency operation of lamp 10. Conduction time of the drive circuit for transformer winding 14, as hereafter further explained, is for about one-quarter or 90 degrees of the operating cycle of the voltage across the lamp.

The frequency of operation of the current and voltage applied to lamp 10 is determined by the resonance of the tank circuit comprising coil 18 and capacitor 16, with capacitor 12 exerting some influence. Normally, capacitor 16 will have at least twice the capacitance value as capacitor 12, although it may have many times such value. Moreover, when lamp 10 represents a large load, the influence of capacitor 12 lessens and hence, the frequency of operation is almost solely dependent on the values of components 16 and 18.

Viewing the right side of the drawing, npn triode transistor 24 is connected with its collector terminal to the adjacent end of transformer winding 14 and its emitter connected to ground. Although illustrated as an npn transistor, it is understood that component 24 may be a pnp, an SCR of other active device connected in a suitable circuit for functional operation in accordance with the present invention. The base of transistor 24 is connected to the drive circuit, the drive voltage and current being principally derived from transformer winding 26 and capacitor 28, as hereafter explained.

A fast recovery clamping diode 25 is connected across the collector-emitter connection of transistor 24. A resistor 30 connected in parallel with another fast acting diode 32 connects the base of transistor 24 to ground. A slow-acting diode 34 is connected in series with capacitor 28 and the base of transistor 24. Resistor 36 is connected across diode 34.

In operation of transistor 24 and its related components, an applied dc voltage on terminal 22 causes conduction of transistor 24. The voltage drop across starter resistor 38 biases transistor 24 into its linear region of operation. Positive feedback supplied by transformer isolation winding 26, which may be only a single turn magnetically coupled with winding 14, causes conduction turn on to become greater with each cycle. When the high gain region of transistor 24 is reached, it then turns on hard and the oscillator will be operating at full amplitude. Once full turn-on operation of transistor 24 has been established, the currents through winding 14 and through the tank circuit comprising coil 18 and capacitor 16 drive transistor 40 into conduction on alternate half cycles from the conduction of transistor 24. Operation is sustained for transistor 40 in a manner similar to that for transistor 24, described more fully hereinafter.

Under steady operating conditions, fast turn-on of transistor 24 at each cycle is influenced primarily by three factors. First, previously turn-on, the base emitter junction of transistor 24 is barely reversed biased because diode 32 clamps the reverse biasing voltage to a small value. This means that at turn-on, there is only a small negative voltage on this base-emitter junction that needs to be overcome.

Second, capacitor 28, diode 34, and winding 26 in the base circuit of transistor 24 for supplying the drive voltage are all low impedance devices. Therefore, the drive source to transistor 24 responds rapidly.

Third, diode 32 is a fast-acting diode. Diode 32 conducts during turn-off. If it continued to conduct for a short time during turn-on, then it would take current from the drive circuit, but it does not, and therefore the full source is immediately applied to turn on the transistor.

Turn off of transistor 24 is fast primarily because of the slow action of series diode 34. As previously mentioned, diode 34 has a low impedance. Its slow recovery causes a fast reverse current drain of transistor 24 during turn off, and hence, causes transistor 24 to turn off rapidly. Note that even though turn-off is rapid, it is not "hard" (i.e., a large base-emitter voltage is not developed) because of the clamping action of diode 32.

Diode 25 is also a fast acting diode, primarily because of operating conditions during start up and when the tank circuit becomes unloaded (such as with a failure of lamp 10). The diode clamps the voltage applied to it when the tank circuit tries to force voltage $V_{ce}$ below ground and therefore keeps transistor 24 from being overdriven. The reverse recovery time is fast to prevent shorting out the tank.

Resistor 30 protects transistor 24 during build up of oscillations at start up when the transistor is off by reducing the collector-to-emitter leakage current.

Alternate transistor 40 operates in a similar manner to that just described for transistor 24, but on alternate frequency cycles of the developed current determined by the resonant tank-and-lamp circuit. Variable resistors 36 and 42, around the respective series capacitors, and variable capacitors 28 and 44, in respective series therewith, are part of the drive circuits for transistors 24 and 40 to provide adjustment for operation of the circuit.

"Q" or "Q factor" is a figure of merit for an energy-storing device or a tuned circuit, which for the embodiment disclosed herein would be coil 18. Q is equal to the reactance of such device divided by its resistance. The Q determines the rate of decay of stored energy and hence the higher the Q the more efficient the device. Therefore, high Q operation in a gaseous-discharge lamp circuit is highly desirable.

Diagramatically, and assuming core, frequency, voltage and temperature to be constant, high-Q for a given coil may be represented by FIG. 3 which shows a three-dimensional relationship between number of turns and air gap to achieve a high-Q operation. This Q curve is arrived at experimentally by the following procedure. A selected number of turns is chosen for a given size pot core. A wire size is selected and bundled with other similar wires to form a litz wire combination so that the core may be wound to nearly completely fill the bobbin and thereby minimize copper loss. Then a gap is selected and a point on the Q "mountain" is measured. Other gap spacings are then made and other points at that number of turns measured. The entire process is then repeated for other numbers of turns. By this process the "peak" of the Q mountain is determined, as illustrated in FIG. 3. A coil for operating as coil 18 for providing high voltage and high frequency to gaseous-discharge lamp 10 may be made on a pot core made of ferrite material.

Following the above described procedure and using No. 40 insulated wire, a bundle of such wire comprising 85 strands twisted together was wound on a No. 2616 Ferroxcube nylon bobbin in such a manner as to form five layers of eight turns each. Each layer was insulated from the adjoining layers by Mylar tape. The two parts of the core (with a wound bobbin in between) were separated so as to form an air gap of approximately 65 thousandths of an inch. A nylon screw through the two parts of the core was used to secure them together. It is important that a metallic screw not be used. It is important that both the bobbin and the screw be of materials having a low dielectric loss at high frequency.

A coil made in the above manner is nominally rated for a Q of 300 at 240 volts rms, 100 kHz. Such a coil is illustrated in cross section in FIG. 4.

In a similar fashion, a twisted bundle of 189 No. 44 insulated wire strands was found acceptable in making a similar coil. Further, to achieve a higher voltage rating, a coil of 60 turns was made for operating in conjunction with multivapor lamp operation.

Note that the tank circuit is connected to lamp 10 and hence the reactance and resistance of lamp 10 influence the Q of the entire tank-and-lamp circuit. The efficiency of the tank or resonant circuit may be represented by the following formula:

Efficiency: $(Q_u - Q_1)/Q_u$ wherein:
$Q_u$ = Q of tank circuit only without other components
$Q_1$ = Q of circuit under load Hence, when unloaded $Q_u$ is high, the efficiency of the tank circuit may be very high on the order of 97–99 percent. An efficiency of about 85 percent is achievable for the overall circuit shown in FIG. 1 with the coil structure herein disclosed.

The operation of the tank-and-lamp circuit may be analogized to the operation of a mechanical swing with little friction. At the end of each arc of the swing, a small push is provided. The more the friction (load), the more the power consumption and hence the more the push necessary to make the swing make the same arc. Hence, as seen in FIG. 2, $I_c$ is for a short duration and the transistor is slightly over driven (beyond a sine wave drive).

The transformer comprising winding 14 and isolation winding 26 and its alternate may be made identically to coil 14, except in this case, the air gap may be eliminated.

Transformer winding 14 may also include taps 46 and 48 spaced equal distance from center tap 20 toward the two respective ends of the winding. Such taps provide connection of the transistors to provide a higher voltage to the lamp than with the end connections, as shown. This is particularly advantageous in operating a multivapor lamp 10.

FIG. 5 illustrates a regulation circuit acting in conjunction with the circuit shown in FIG. 1. There are two identical networks 100 and 102 operating in conjunction with the respective alternate halves of the oscillator. For simplicity of illustration, only the half operating in conjunction with transistor 40 is illustrated in detail.

Connected across capacitor 44 and its accompanying transformer isolation winding 111 is the following series connection: diode 104, collector-emitter of pnp transistor 106 and resistor 108. Connected to the high side of the winding is the cathode of diode 110 and connected to the anode thereof to ground is capacitor 112. Connected across capacitor 112 is the series combination of Zener diode 114, variable resistor 116 and diode 118 for matching the base-emitter drop of transistor 120. The variable tap on resistor 116 is connected to the base of pnp transistor 120. The emitter of transistor 120 is connected to ground through resistor 122 and the collector thereof is connected to the anode of Zener diode 114 via resistor 124. The collector of transistor 120 is connected to terminal 126, otherwise designated $V_{R1}$ and the base of transistor 106 is connected through resistor 128 to terminal 130, otherwise designated $B_1$.

In operation of the regulation circuit of FIG. 5, the voltage on the base winding, designated with numeral 111, charges capacitor 112 through 110. When the charge on capacitor 112 exceeds the voltage thresholds of Zener diode 114 and diode 118, current flows across resistor 116. This turns on transistor 120 as an amplifier. As the voltage on resistor 122 increases, the voltage on resistor 124 increases and the voltage at terminal 126 decreases with respect to ground. Assume that terminal 126 is connected to terminal 130, an alternative connection thereof as explained hereinafter, as the voltage on resistor 108 decreases current through transistor 106 decreases, hence reducing the amount of discharge from capacitor 44.

The voltage on base winding 111 plus capacitor 44 appears across the series connection of resistors 326 and 108, transistor 106 and diode 104. When transistor 106 conducts less, the less capacitor 44 discharges. Hence, on the next half-cycle of voltage operation of transistor 40, the less current capacitor 44 can deliver before charge up. On FIG. 2, this may be seen as a higher intersection of $V_{C1}$ with the curve of $V_{B1}$ and hence the delay in starting of $I_{B1}$.

Hence, it may be seen that when the voltage on base winding 111 exceeds a predetermined value, diode 110 conducts to cause a regulation voltage signal $V_{R1}$ to occur at terminal 126. The adjustment of resistor 116 determines the value of the output.

Although regulating voltage signal $V_{R1}$ may be attached to terminal 130, its preferred connection is to alternate terminal $B_2$ of regulating network 102 and terminal 130 is preferably connected to receive the alternate regulating voltage signal $V_{R2}$ from network 102. This is because when transistor 40 is conducting, base winding 111 is loaded. It is best to sense the unloaded winding voltage for regulation purposes, which would indicate the preference for the connections shown in FIG. 5.

In any event, when there is a regulating signal applied to terminal 130, there is conduction of transistor 106 to partly discharge capacitor 44 and to thereby regulate the circuit. This protects transistor 40 from overheating by preventing an extensive overdrive condition. In similar fashion transistor 24 is also protected.

Although one regulation circuit is shown, many alternative arrangements are also available. For example, an alternate preferred embodiment is illustrated in FIG. 10.

The embodiment which is illustrated is a partial schematic diagram which assumes a similar network is connected to the opposite end of transformer winding 14 so that the complete circuit operates as a push-pull, Class C oscillator as previously described. The exception is that with this embodiment, only one regulating circuit is necessary, to be described hereinafter. Components numbered less than 200 in the FIG. 10 embodiment identify similar components to those illustrated in FIGS. 1 and 5, which are connected similar fashion.

Resistor 310 is connected between capacitor 312, across which the dc input from the power supply is applied, and circuit common which may be a floating ground. This is also true for the common connectors illustrated with a ground symbol in other drawings. Diode 314 is connected in parallel across resistor 310. The cathode of diode 314 is connected through current limiting resistor 316 to the anode of light emitting diode (L.E.D.) 318. The cathode of L.E.D. 318 is connected to common. L.E.D. 318 is packaged in an opto-isolator with phototransistor 320. Phototransistor 320 is connected between the anode of diode 110 and the base of npn transistor 120. Base resistor 322 is connected to the base of transistor 120 and capacitor 324 is connected to its collector. The output from transistor 120 is taken from its collector and is labelled "$V_c$". Connection of this output 126 is made to points or terminals "B$_1$" (130) and "B$_2$", previously described.

Connected across capacitor 44 and its accompanying transformer isolation winding 111 is the following series connection: variable resistor 326, diode 104, collector-emitter of Darlington pair transistors 106 and resistor 108. The base of Darlington pair transistors 106 is connected through resistor 128 to point 130 (B$_1$), which point is connected to point 126, where $V_C$ is present.

The circuit will regulate and operate in a satisfactory manner without further connection. However, to ensure smooth operation with both halves of the push-pull oscillator, the junction point between diode 110 and capacitor 112 can be connected to an anode of a diode 330, the cathode of which is connected to transformer isolation winding 26. In this event, capacitor 112 is charged up each half cycle of oscillator operation.

In operation, this regulation circuit senses the presence of too much base drive by sensing the negative current through power device or transistor 40 with resistor 310. Negative current through device 40 causes a positive voltage across resistor 310. This voltage causes current to flow through L.E.D. 318, and hence phototransistor 320 conducts current. When this occurs, the base drive to transistor 120 is reduced to cause $V_C$ to decrease and to allow less current to flow through Darlington pair 106. Thus, capacitor 44 discharges less and the next cycle of base drive to transistor 40 is less than before.

The base drive increase is controlled by the time constant of the R of resistor 124 and the C of capacitor 324. The base drive decrease is controlled by the time the constant of C of capacitor 324 and the R of resistor 128 (and its counterpart at terminal B$_2$). So that an HID lamp being ignited will not cause tank circuit oscillations to die out, the time constant of resistor 124 and capacitor 324 is a shorter time constant of the two.

Transistor 106 is preferably a Darlington pair in the FIG. 10 embodiment for greater amplification. This permits capacitor 324 to be smaller and allows regulation with less conduction by transistor 120.

It may also be noted that a variable resistor 326 is present in the collector-emitter series connection of transistor 106 to provide a variable control for the base drive to power device 40 when the HID lamp or lamps connected to the circuit warms up. As the lamp or lamps warm up, transistor 106 begins to conduct. The rate of conduction is not linear, however. When the lamp is approximately one-third brightness, transistor 106 is substantially completely turned on and hence the current therethrough controls the base drive. Therefore, resistor 42 provides control for the base drive current during start up and resistor 326 provides control for the base drive current after the lamp or lamps have reached a certain warm up condition.

Now turning to a suitable power supply, reference is made to the circuit illustrated in FIG. 6. The applied ac source imput is connected to the illustrative power supply at terminals 50 and 52. Input coils 54 and 56 connected to these terminals, respectively, and varistor 58, connected in parallel with resistor 60 and capacitor 62, are connected across the ac input line to perform a transient clipping operation.

Triac 64 is a power control device connected in series with one side of the ac line and controlled by variable conduction phase control 66 to provide ac power control over a wide range of applied power.

Device 64 may also be an SCR or other active device having a controllable gate for regulating conduction through the device for only a part of each half cycle of the applied voltage. When the detected dc output from rectifier 68 is too high, control circuit 66 connected thereto triggers the gate to lessen the conduction time, and hence the effective output. The control circuit may include a convenient timing network having an RC time constant circuit to provide this function. A more complete circuit is illustrated in FIG. 7.

The output from the power control device 64 is applied to rectifier 68. The output from the rectifier is nominally the dc line voltage. However, transients may be present and therefore capacitor 70, together with yet another transient circuit to be described, is connected to prevent such transients from being applied to the output.

Nominal output from the rectifier appears on output line 72. The anode of diode 74 is connected thereto with its cathode connected to the top of battery 76. Also connected to the cathode of diode 74 is resistor 78, which, in turn, is connected to a small dc power supply 80, the other side of which is connected to line 72. For illustration purposes, this supply is shown as providing 10 volts. Therefore, the connection to resistor 78 is at a level 10 volts higher than the voltage on line 72.

By example, the voltage on line 72 may be nominally 170 volts. This would make the output of power supply 80 at 180 volts. Assuming a 5-volt drop across resistor 78, the voltage at the cathode of diode 74 is at 175 volts.

When the line voltage exceeds a predetermined value slightly above 175 volts, the same as the cathode voltage on diode 74 (175 volts), diode 74 conducts and reduces the line voltage to 175 volts. The batteries also effectively clips any transients that still may occur on the output from the rectifier, but because of the other transient attentuators, the batteries are not required for this purpose.

Battery 76 as illustrated includes many cells and provides a voltage at a predetermined level slightly below the nominal line voltage. In any event, connected near the top side of the battery, but just below the top, is the anode of diode 82. The cathode of diode 82 is connected to output line 72. Hence, when the line voltage falls below a predetermined level, battery 76 completely takes over through diode 82 and the output therefrom is applied as the line voltage to the output.

Note that low voltage power supply 80 also provides a trickle charge to battery 76.

A low voltage sensing and cutout circuit 84 may be connected to the battery so that when there is battery failure (output drops below an acceptable predetermined level), the battery will be disconnected from the circuit and not be a drain on low voltage power supply 80. Additionally, sensing circuit 84 may also detect an extended power outage of the ac source, which would cause the lamp module(s) to put a drain on the batteries over a long period of time. In this event, a switch in line 72, for example at terminal 90, would be opened to disconnect the load from the batteries.

Note that the battery circuits are principally for emergency operation and not required when the output from rectifier 68 is within acceptable limits or to suppress transients.

A so-called crow bar circuit 86 may be used to protect the circuit from sudden extreme surges, such as might be caused by lightning. One such device may merely be a voltage amplitude sensing device that shorts out, and therefore places a short across the input line, to blow a fuse or circuit breaker (not shown). Because replacing fuses or resetting circuit breakers is a nuisance, a preferred crow bar arrangement is shown in FIG. 6. Such a preferred device 86 includes a voltage sensing element and a relay coil connected to normally closed relay contacts 88 in the input line to rectifier 68. When the voltage on this line exceeds a predetermined value, an internal relay coil in device 86 is energized to open contacts 88. When the applied line voltage returns to a more normal level, the sensing element deenergizes the internal relay coil and closes contacts 88. Crow bar circuit 86 may also be sensitive to rate-of-voltage change so as to operate faster than just with an amplitude change. This device is strictly a safety device and not required for circuit operation. A detail preferred network is shown in FIG. 7.

The output on line 72 is filtered from remaining transients by capacitor 70, as previously mentioned. It also may be seen that with a low line voltage condition requiring switching to the battery, as above explained, the voltage on capacitor 70 helps prevent the lamp connection from being interrupted and therefore the possible loss of light.

Control circuit 66 connected to control the conduction through power control device 64 may take the form of a circuit for monitoring the output dc level on line 72 including a light emitting diode. That is, the higher the voltage above a preset level (such as determined by a series-connected Zener diode), the brighter the produced light. This produced light is detectable by a photo-sensitive device in an RC network for controlling the angle of conduction (time of conduction) through device 64. A detail network operating in this manner is shown in FIG. 7.

The output is applied to output terminals 90 and 92. These terminals, one of which may be grounded, such as illustrated at 92, are applied as the dc input to terminal 22 in FIG. 1.

Now referring to FIG. 7, it may be seen that a detail circuit operating in the manner just described for FIG. 1 is illustrated. For example, rectifier 68 is illustrated by the conventional diode bridge comprising diodes 68a, 68b, 68c and 68d. Varistor 58 and the filter including resistor 60 and capacitor 62 in the simplified circuit of FIG. 1 are expanded to include varistors 58a, 58b and 58c and there are two transient filters, one including resistor 60b and capacitor 62a and the other including resistor 60b and capacitor 62b.

Inductors 54 and 56 are expanded to include inductors 54a and 54b and 56a and 56b. Inductors 54a and 56a at the input are preferably ferrite core inductors. These inductors and the first stage varistors and transient filters attenuate fast transients and reduce their frequencies so that subsequent tape-wound, steel-core inductors 54a and 54b and varistor 58c, resistor 60b, and capacitor 62b can attenuate the existing transients still further.

The crow bar circuit 86 is shown in FIG. 7 as including many components. Relay contacts 88 are actuated by coil 200, connected in parallel with resistor 202 and in series with triac 204. Connected from resistor 202 to the gate terminal of the triac is box Z circuit 206, which is explained more fully below. The gate resistor is resistor 208. This circuit forms a load-disconnecting, transient-shunting, non-fuse blowing protection circuit.

Box Z circuit 206 may take the form of either of the circuits shown in FIGS. 8 and 9, or their equivalents. For example, the FIG. 8 circuit includes two opposite facing Zener diodes 210 and 212 connected in parallel with capacitor 214. FIG. 9 shows a parallel combination of Zener diode 216 and capacitor 218 connected to diodes 220, 222, 224 and 226. These diodes form two paths around the parallel combination, each path comprising two diodes. The connections to the circuit of FIG. 7 are made to the juncture between the two diodes in each of the paths. In operation, the Zener diodes operate as amplitude sensing devices and the capacitors in the respective circuits are sensitive to rate of voltage change. When the gate voltage on the triac exceeds about 1 volt, caused by either sensing a large voltage amplitude or a fast voltage increase, then the triac conducts. This energizes relay coil 200 to open normally closed contacts 88. The removal of the triggering condition will cause the contacts to re-close.

Control circuit 66 may be characterized as a soft-start circuit for the operation of the power supply. Ultimately, the application of source voltage to the rectifier bridge shown in FIG. 7 is controlled by triac 230, the conduction time of which is determined by the operation of pulse transformer 232. Winding 232 is magnetically linked to winding 234 in the cathode circuit of programmable unijunction transistor (PUT) 236. The control of the operation of PUT 236 is described below.

The gate connection to PUT 236 is connected to a rectified dc voltage via variable resistor 238. The rectified voltage is derived from bridge rectifier 240 connected across the ac source line through current limiting resistors 239 and 241 just ahead of triac 230. The timing of the conduction of PUT 236 is determined by the voltage difference between the voltage applied via resistor 238 and the voltage applied to the anode of PUT 236. Both the voltage applied to the anode and to the gate of PUT 236 are important to its conduction.

That is, conduction is dependent on the arithmetic difference between the voltage applied to the anode and gate. Therefore, the setting of resistor 238 "programs" what anode voltage is required to produce conduction. The dc voltage applied to resistor 238 is developed by bridge rectifier 240. A Zener diode 242 and bleeder resistor 244 insures that the voltage applied to resistor 238 never exceeds a predetermined value.

The output from bridge rectifier 240 is also connected through resistors 246 to a time constant control network connected to the anode of PUT 236. This time constant network includes capacitors 248 and 250 and resistors 246 and 252. Basically, the charging of capacitor 248 through resistor 246 determines the soft start or the ultimate speed of conduction or angle advancement in the coaction of triac 230 and the charging of capacitor 250 through resistor 252 determines the phase or conduction angle of triac 230. The RC time constants of these networks and the voltages applied to them, as explained below, are important in the operation of this regulation circuit.

The photo transistor voltage is determined by the brightness of the light emitting diode connected in series with resistor 262 and Zener diode 264 across dc line 72. The resistor and Zener diode protect L.E.D. 260 against an overload condition.

By this operation, it may be seen that the L.E.D. and photo transistor regulate the dc output voltage and that there is really no regulation of the ac input. A too high dc voltage causes Zener diode 264 and L.E.D. 260 to conduct, turning photo transistor 258 partly on and retards the phase or firing angle of triac 230 to thus lower the dc output to about the voltage for causing conduction of Zener diode 264 and L.E.D. 260.

Fuses 270 and 272 at the input and 274 and 276 provide further safety to the circuit.

Now referring to FIG. 11, an alternate embodiment of a suitable power supply is illustrated, the primary differences to the circuit shown in FIG. 7 being in the network associated triac 204 operating as a crow bar power device. The transient clipping and attenuation circuit 63 preceding this network is the same as that illustrated for FIG. 7. Triac 230 for ultimately controlling the application of source voltage to rectifier bridge 68 is connected in the positive line. Its gate voltage for determining the time of its conduction is controlled by the operation of pulse transformer 232, as with the FIG. 7 embodiment. The main terminals of triac 230 are connected to rectifier 68, which is preceded by bleeder resistor 219.

Connected across the line just ahead of resistor 219 is the RC network comprising resistor 215 and capacitor 217. Back-to-back Zener diodes 209 are connected to the high side of capacitor 217 and, through resistor 207, to the gate terminal of triac 204. The main terminals of a triac 205 are connected between the high side of capacitor 217 and the gate of triac 204. The gate of triac 205 is connected to the junction between resistor 207 and back-to-back Zener diodes 209. Gate resistor 211 to triac 204 completes the network.

In operation, crow bar power device 204 is turned on only when the voltage across capacitor 217 exceeds the Zener voltage across Zener diodes 209. Transients occurring when triac 230, which may be functionally characterized as a softstart/regulation circuit power device, is off, are not applied to the ac input of rectifier bridge 68. Hence, capacitor 217 is not charged up and the crow bar is not activated. When triac 230 is on and a transient occurs that is large enough to endanger the electronic ballast or ballasts connected to the dc output, the transients remaining after treatment by transient suppression circuit 63 are applied to the ac side of rectifier bridge 68 and to RC network comprising resistor 215 and capacitor 217. If the voltage on capacitor 217 is great enough, triac 204 is triggered as a result of back-to-back Zener diode 209 triggering triac 205. Since the transient can be either positive or negative, one or the other of the two Zener diodes will conduct to initiate the triggering action.

It should be also noted that resistor 215 and capacitor 217, in combination with capacitor 62b, form a snubber for in-line triac 230.

While particular embodiments of the invention have been shown and described, it will be understood that the invention is not limited thereto, since modifications may be made and will become apparent to those skilled in the art. For example, the operation of a single lamp module as illustrated in FIGS. 1 and 5 has been described. It is understood that the preferred embodiment will include a plurality of such modules connected to a common power supply, such as illustrated in FIGS. 6 and 7.

Furthermore, it may be recognized that the dc power supply which has been described is a preferred embodiment with somewhat elaborate features for ensuring highly stable dc output to the high frequency operating circuit for the lamp. Such an elaborate supply may not be desirable for installation not having extremely important stability requirements.

I claim:

1. A circuit for operating a high frequency, gaseous discharge lamp, comprising
   a push-pull, Class C oscillator having a resonant circuit including a high-Q coil connected to a first operating electrode of the lamp, said oscillator being connected to a power source, said resonant circuit establishing an operating frequency in the range between approximately 60 kHz and 100 kHz,
   a ballast impedance connected to a second operating electrode of the lamp, and
   said high-Q coil in said resonant circuit providing the lamp with high power and high frequency current.

2. A high frequency, gaseous-discharge lamp operating circuit as set forth in claim 1, wherein said resonant circuit establishes an operating frequency for said oscillator at a frequency above the acoustic resonant frequencies of the lamp.

3. A high frequency, gaseous-discharge lamp operating circuit as set forth in claim 2, wherein said resonant circuit establishes an operating frequency for said oscillator at a frequency in the range between approximately 60 kHz and 100 kHz.

4. A high frequency, gaseous-discharge lamp operating circuit as set forth in claim 1, wherein said oscillator includes a center-tapped transformer connected across said high-Q coil and alternate networks connected to opposite ends of said transformer, each of said networks comprising
   a base-driven triode transistor, the collector-emitter circuit being connected between the adjacent end of said transformer primary winding and ground, a low impedance drive circuit including an isolation winding of said transformer, and a fast-acting diode connecting the base of said transistor to ground so as to prevent hard turn-off operation of said transistor, thereby enhancing fast turn-on operation thereof.

5. A high frequency, gaseous-discharge lamp operating circuit as set forth in claim 4, and including regulating means connected to said transformer and to said base-driven triode transistor for changing the conduction time of said transistor when the voltage applied to said transformer exceeds a predetermined value.

6. A high frequency, gaseous-discharge lamp operating circuit as set forth in claim 5, wherein said regulating means is connected to a base winding of said transformer, said drive circuit includes a capacitor charged by the voltage on said base winding, the discharge thereof determining the conduction of said transistor, and said regulating means includes semiconductor means connected to said capacitor for controlling the discharge of said capacitor and thereby the conduction time of said transistor.

7. A high frequency, gaseous-discharge lamp operating circuit as set forth in claim 4, wherein each of said oscillator networks includes a slow-acting diode connected in series with the base of said transistor having a recovery time longer than the turn-off time of said transistor to provide fast reverse current drain therefore, thereby speeding turn-off of said transistor.

8. A high frequency, gaseous-discharge lamp operating circuit as set forth in claim 4, wherein said transformer includes a first and second tap connection equal distance from said center tap toward respective ends of said transformer for connecting said oscillator to provide higher voltage to the lamp than with end connections.

9. In a circuit for operating a high frequency, gaseous-discharge lamp including a ballast connected to receive a dc source voltage and a base-driven triode transistor for supplying at least a portion of the high frequency current to the ballast, the improvement comprising regulating means connected to the ballast and the base-driven triode transistor for changing the conduction time of the transistor when the voltage applied to the ballast exceeds a predetermined value, said regulating means being connected to a base winding of the ballast, a drive circuit connected to said base-driven triode transistor including a capacitor charged by the voltage on said base winding, the discharge thereof determining the conduction of said transistor, and said regulating means including semi-conductor means connected to said capacitor for controlling the discharge of said capacitor and thereby the conduction time of said transistor.

10. A high frequency, gaseous-discharge lamp operating circuit as set forth in claim 9, and including resistance means for sensing the presence of current applied to said ballast, and photoelectric means connected to said resistance means and said semiconductor means, the voltage on said resistance means determining the conduction of the controlling semiconductor means and the discharge of said capacitor and thereby the conduction of said base driven triode transistor.

11. A transformer power supply in a gaseous-discharge lamp energizing circuit for providing a stable dc level output voltage from an arc source input voltage applied to its input terminals, comprising a rectifier coupled for receiving said ac source input voltage and for providing a rectified output voltage;

gate controllable means coupled to the ac source input voltage and to said rectifier for controlling the periods during which the ac voltage is applied to said rectifier in response to the amplitude of the rectified output voltage, thereby limiting the power output of the power supply; and transient clipping means coupled across the input terminals to receive the ac voltage from the ac source for producing a transient clipped ac voltage.

12. The power supply as set forth in claim 11, wherein said transient clipping means includes a varistor.

13. A transformerless power supply in a gaseous-discharge lamp energizing circuit for providing a stable dc level output voltage from an ac source input voltage applied to its input terminals, comprising a rectifier coupled for receiving said ac source input voltage and for providing a rectified output voltage;

gate controllable means coupled to the ac source input voltage and to said rectifier for controlling the periods during which the ac voltage is applied to said rectifier in response to the amplitude of the rectified output voltage, thereby limiting the power output of the power supply; and emergency power supply means comprising:

a battery connected to said rectifier; and means connected to said battery and to said rectifier for reducing the value of the rectified output voltage to within predetermined limits when the rectifier output voltage exceeds such limits and for increasing the rectified output voltage to within the predetermined limits when the rectified output voltage falls below such limits.

14. A power supply as set forth in claim 13 and including crow bar means coupled to the rectifier for selectively decoupling the transient clipped ac voltage from the rectifier upon application to the input terminals of an overload voltage condition or of an applied voltage transient faster than a predetermined rate.

15. A power supply as set forth in claim 14 wherein the gate controllable means includes a thyristor, and slow start means coupled to the gate of said thyristor for varying the conduction angle thereto in accordance with a time relationship determined by the amplitude of the rectified output voltage.

16. A power supply as set forth in claim 15 and including photoelectric means responsive to the rectified output voltage for varying the conduction angle of the thyristor according to the dc output level.

17. A circuit for operating a high frequency, gaseous discharge lamp, comprising;

a ballast impedance connectable to the lamp, and an oscillator operating at a substantially constant frequency above the acoustic resonance frequency of the lamp connectable thereto, said oscillator providing the lamp with high power and high frequency current.

18. A circuit for energizing a gaseous-discharge lamp, at high frequency, the lamp characterized by one or more acoustic resonant frequencies at which acoustic resonance occurs to thereby disrupt energization to the lamp and produce visually detectable distrubances in the light emitted from the lamp, said circuit comprising:
 a ballast impedance connectable to the lamp; and
 an oscillator circuit for providing the lamp with high frequency power and current at a frequency higher than said more than one acoustic resonant frequencies,
 said oscillator circuit including means for generating said higher frequency at a substantially constant higher frequency during operation of the lamp.

19. A circuit for operating a high frequency, gaseous discharge lamp, comprising:
 a push-pull, Class C oscillator having a resonant circuit including a high-Q coil connected to a first operating electrode of the lamp, said oscillator being connected to a power source, said resonant circuit establishing an operating frequency for said oscillator at a frequency above the acoustic resonant frequencies of the lamp,
 a ballast impedance connected to a second operating electrode of the lamp, and
 said high-Q coil in said resonant circuit providing the lamp with high power and high frequency current.

* * * * *